Figure 1:
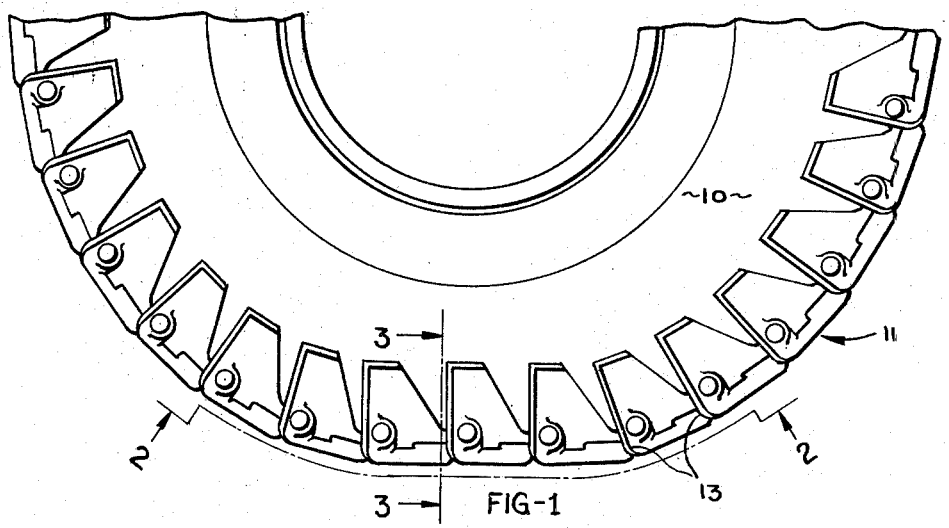

Sept. 25, 1956 S. F. ARMINGTON 2,764,211
TIRE TRACK SHOE WITH REVERSE CHEVRON
Filed Jan. 19, 1954 2 Sheets-Sheet 1

INVENTOR.
Stewart F. Armington
BY
Hyde, Meyer, Baldwin & Doran
ATTORNEY

Sept. 25, 1956 S. F. ARMINGTON 2,764,211
TIRE TRACK SHOE WITH REVERSE CHEVRON
Filed Jan. 19, 1954 2 Sheets-Sheet 2

INVENTOR.
Stewart F. Armington
BY
Hyde, Meyer, Baldwin & Doran
ATTORNEY

United States Patent Office 2,764,211
Patented Sept. 25, 1956

2,764,211

TIRE TRACK SHOE WITH REVERSE CHEVRON

Stewart F. Armington, Willoughby, Ohio, assignor to General Motors Corporation, Detroit, Mich., a corporation of Delaware Application January 19, 1954, Serial No. 404,852

10 Claims. (Cl. 152—182)

This invention relates to improvements in a combination of a large pneumatic tire and an endless track completely surrounding and partially embracing the tire.

An object of this invention is to provide a novel track for use with pneumatic tires, wherein such track is constructed with minimum thickness and weight, and yet provide maximum protection for the tire against abrasion and other rough usage.

Another object of the present invention is to provide a novel track for use with pneumatic tires wherein the track is formed from a plurality of shoes, each shoe having a ground engaging projection on its outer surface and a tire engaging projection on its inner surface.

Another object of the present invention is to provide a novel track for use with pneumatic tires wherein the track is formed of a plurality of shoes, each shoe having a chevron or V-shaped grouser on the ground engaging side of the shoe and a chevron or V-shaped rib on the tire engaging side of the shoe whose apex is oppositely disposed with respect to that of the grouser.

Another object of the present invention is to provide an endless track of the type described, composed of a plurality of rigid shoes with hinged connections between adjacent shoes, the ground engaging side of each shoe having a V-shaped grouser whose distal ends coincide with and incorporate an outer hinge pin boss and the tire engaging side of the shoe having a V-shaped rib whose distal ends coincide with and incorporate an inner hinge pin boss, thereby providing maximum traction and strength with a minimum shoe thickness and weight.

Another object of the present invention is to provide a tire track shoe characterized by its structural simplicity, the ease of assembly of its parts, its strong and sturdy nature and its low manufacturing costs. Other features of this invention reside in the arrangement and design of the parts for carrying out their appropriate functions.

Other objects and advantages of this invention will be apparent from the accompanying drawings and description and the essential features will be set forth in the appended claims.

Figure 2:
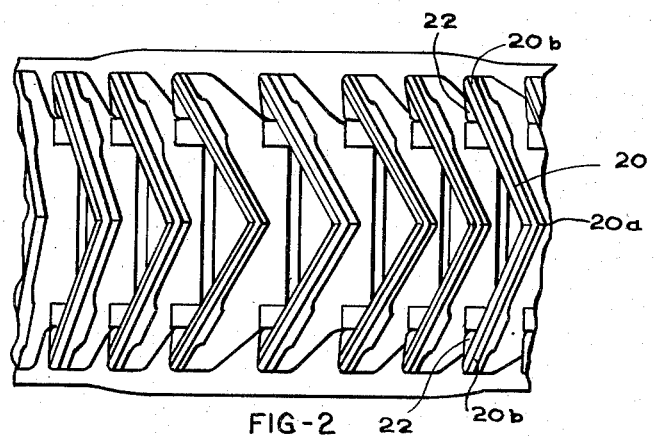
Figures 3, 4:
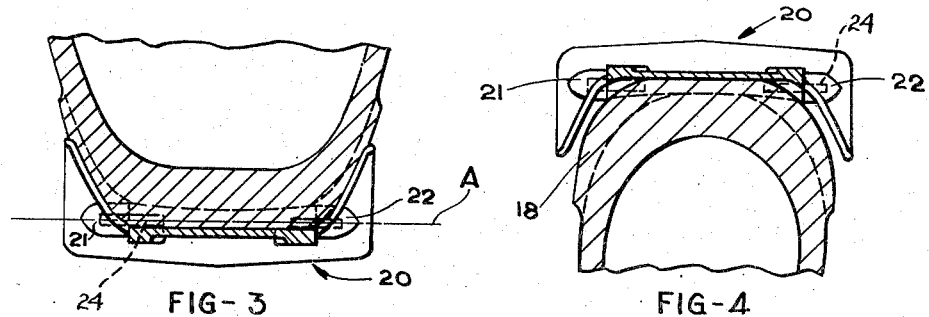
Figure 5:
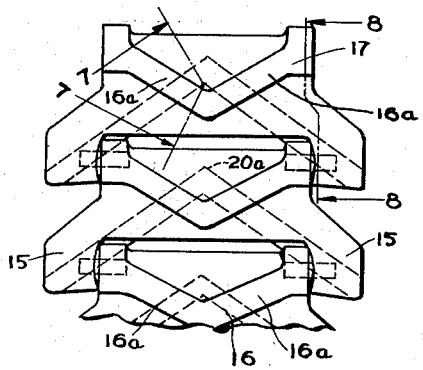
Figure 6:
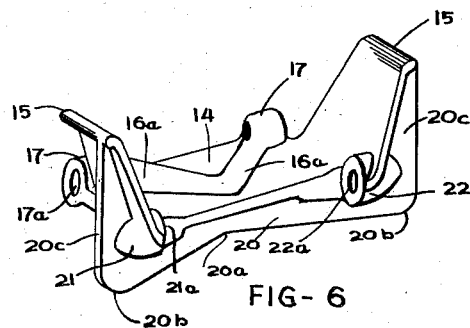
Figure 7:
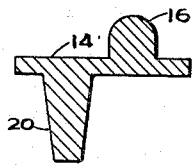
Figure 8:
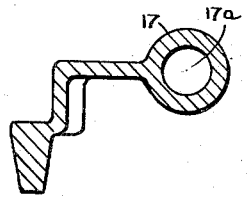

In the drawings,

Fig. 1 is a fragmental side elevational view showing a pneumatic tire with my improved endless track mounted on the tire with the entire combination under load, Fig. 2 is a bottom view of the loaded track taken on the line 2—2 of Fig. 1, Fig. 3 is an enlarged fragmental sectional view taken along the plane of line 3—3 of Fig. 1, Fig. 4 is an enlarged fragmental sectional view similar to Fig. 3, but taken at a non-ground engaging portion of the track and preferably diametrically opposite the section shown in Fig. 3, Fig. 5 is a plan view of the inner or tire engaging surface of a series of track shoes, Fig. 6 is a perspective of one of the shoes or cleats forming the track of Fig. 1, Fig. 7 is an enlarged sectional view taken along the line 7—7 of Fig. 5, Fig. 8 is an enlarged sectional view taken along the line 8—8 of Fig. 5.

Off-the-road vehicles use large pneumatic tires for the two-fold purpose of carrying the load and providing a large supporting area for operations where ground supporting conditions are poor, such as in sand and mud. With the increasing use of greater power for driving such vehicles, it becomes necessary to increase the tractive effect of such tires in order to handle the load involved. In order to gain an increased measure of tractive effect, the present invention applies an endless track consisting of a series of individual shoes or cleats around the tire. I find that the most effective type track for achieving this effect is one which has its ground engaging surface provided with grousers. The most practical type grouser from the standpoint of efficiency in propelling the vehicle forward and yet provide adequate support for heavy loads under adverse ground conditions, is one which has substantial length in the direction in which the track travels and also extends radially outward from the circumference of the track to gain a sufficient bite into the ground. The difficulty in using this type of grouser, however, is that its length in the direction of its travel makes for very awkward mounting conditions with respect to the track. The track must of necessity, since it is mounted on the tire, follow a path which turns about a fairly short radius. This limits the length to which the individual track shoes can be constructed. There is thus the difficulty in providing a relatively short track shoe of sufficient strength to prevent the grousers from being torn off and yet retain the necessary degree of flexibility. It is also important that the endless track surround the entire tread of the tire and extend a suitable amount around the side walls so as to give protective effect to the pneumatic tire. It is further important that the endless track firmly engage the tire at all times, so that the tire does not creep within the track and so wear away the rubber.

The tire illustrated herein is an 18" x 25" tire, which means that its overall diameter is approximately five feet, such tire using a pressure no greater than 45 pounds per square inch.

The manner of accomplishing the foregoing objects, as well as further objects and advantages, will be made manifest in the following description.

The tire 10 illustrated herein is of the character that usually has inner tubes, but for clarity, the inner tube has been omitted from Figs. 3 and 4.

The endless track 11 comprises a plurality of identical rigid shoes or cleats 13 made preferably of steel or iron. One of these shoes is clearly shown in Fig. 6. Each shoe consists of a substantially rectangular web or base portion 14 as best seen in Figs. 6 and 7, which is longer crosswise of the tire than it is circumferentially of the tire. The web 14 has a generally flat inner surface for the full width of the tire tread. The end portions 15 of this inner surface diverge outwardly and radially inwardly (as seen when the shoe is assembled on the tire). The flat inner surface of each track shoe contains an upstanding chevron or V-shaped rib 16 having its apex extending close to the center line of the track shoe and tire tread, while the legs 16a diverge outwardly away from this point and terminate in spaced relationship near the end of one of the longer sides of the shoe. At the distal end of each leg 16a, there is provided a hinge pin connection 17 substantially in line with and actually forming a part of the associated leg. The hinge pin connections are in the form of enlarged bosses, having central aligned openings 17a, for receiving a hinge pin. The V-shaped rib 16 conforms to and is adapted to fit into one of the V-shaped grooves 18 which extend across the tire. The tire contains the same number of V-shaped grooves 18 around its circumference as there are V-shaped ribs 16 in the assembled track, one rib fitting into each groove. Each rib on the tire engaging surface of a track shoe is preferably provided with a curved surface having a cross section as indicated at 16 in Fig. 7.

It should be understood that I do not intend to limit my invention to a chevron or V-shaped ground engaging grouser and tire engaging rib. The rib and groused projections could take any of various other forms.

On the ground-engaging surface of each track shoe is an integrally formed chevron or V-shaped grouser 20. The grouser is generally of the same V-shape as the rib 16; however, the apex 20a of the grouser is disposed circumferentially of the tire in an opposite direction to the apex of the rib 16. The apex 20a of the grouser is generally near the center of one of the longer sides of the shoe and its legs 20b diverge outwardly away from this point. The outer ends of the legs 20b terminate in spaced relationship at the ends of the longer side of the shoe. It should be noted that the legs 20b extend upwardly at their outer ends 20c to complement and reinforce the upper edge of the end portion 15 of the web 14. The V-shaped grouser aids the tractive effect and also aids to guide any dirt or mud outwardly along the V-shaped grouser laterally to a point where the material clears the track, thus providing a somewhat self-cleaning action. Near the distal ends of each leg 20b, there are provided hinge pin connections 21 and 22 which extend toward the central portion of the track shoe. The hinge pin connections are in the form of enlarged bosses 21 and 22 having bored openings 21a and 22a, respectively, for receiving a hinge pin 24. The connections 21 and 22 extend partly from the leg 20b and partly from the end portions 15. It can be seen that the bosses 21 and 22 are substantially contained within the structure of the grousers 20.

It will further be noted from Fig. 5 that the offset arrangement of each outer leg 20a places the hinge connection or bosses 21 and 22 of one shoe in alignment with the hinge connections or bosses 17 of the adjacent shoe, such that the outer face of bosses 17 are close to but very slightly spaced from the inner face of each boss 21 and 22. A maximum clear space thus results between adjacent grousers, thereby further facilitating the clearing ability of the track by allowing mud to work out laterally between the grousers. The central openings of the bosses are aligned for the purpose of receiving a short hinge pin 24. It will be noted from Figs. 3 and 4 that the line A through the centers of the hinge pins 24 lies radially inside of the outside diameter of the tire approximately at the radial mid-portion of the carcass tread section of the tire. This construction permits the movement of the track to conform closely to the tire movements as they both flatten on the ground during rotation of the tire and track. It causes the shortening effect of the tire and track to be substantially the same during rotational change from a flattened ground engaging position to a non-ground engaging free circle position.

The track 11 is assembled on the tire 10 with the tire in deflated condition. It is important that an endless track of this type be firmly engaged with the tire at all times, so that the tire does not slip or creep within the track and wear away the rubber. When the endless track is assembled upon the tire 10, the latter is in a deflated or semi-deflated condition, and thereafter fully inflated. The track is thus frictionally held upon the tire under all conditions. When the tire flattens under load against the ground as indicated in Fig. 3, the tire becomes flattened along the tire engaging surface of web 14 so that the tread of the tire substantially fills those portions of the track between the ribs 16. As can be seen in Fig. 4, the bosses formed by connections 17, 21 and 22 set partially into the side portions of the grooves 18 at the top of the tire, which has not been flattened by the load. However, as the tire flattens at the bottom, the tire spreads out sidewardly and the groove 18 envelopes said bosses.

The spreading action of the tire coupled with the well known fact that the grooves 18 tend to be a little closer together on the ground engaging portions of the tire insures that the tire firmly engages the ribs and bosses, thereby preventing chafing or rubbing of the tire, due to slippage of the tire within the track. It further eliminates the possibility of the rib jumping out of the groove of the tire. The novel arrangement of having grouser 20 oppositely disposed with respect to the rib 16 provides important structural advantages. With reference to Fig. 4, the web 14 of the track shoe can be made of a substantially thinner web without reducing the strength of the shoe, since it is reinforced across nearly its entire surface by the diverging legs 16a and 20b of the rib and grouser, respectively. It is of further advantage to have the apex of the grouser pointed in the direction of track travel since a better bite into the ground is achieved.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described a preferred embodiment of the invention, the same is susceptible to certain changes fully comprehended by the spirit of this invention.

What I claim is:

1. In combination, a pneumatic tire having spaced V-shaped grooves extending crosswise of its tread, an endless track completely surrounding and engaging the circumference of said tire, said track comprising a plurality of shoes and articulating connections between adjacent shoes, each of said shoes having a V-shaped grouser rigidly associated with its ground engaging face, and a V-shaped rib in the tire-engaging surface of each shoe, said V-shaped grouser being oppositely disposed with respect to said V-shaped rib, the apex of each grouser lying near the center line of the tire tread and legs diverging therefrom, said articulating connections including hinge pin connections for connecting adjacent shoes together provided in each leg of said grouser near the distal end of said leg.

2. In combination, a pneumatic tire having spaced V-shaped grooves extending crosswise of its tread, an endless track completely surrounding and engaging the circumference of said tire, said track comprising a plurality of shoes and articulating connections between adjacent shoes, each of said shoes having a V-shaped grouser rigidly associated with its ground engaging face, and a V-shaped rib on the tire-engaging surface of each shoe, said V-shaped grouser being oppositely disposed with respect to said V-shaped rib, the apex of each V-shaped rib positioned near the center line of the tire tread and legs diverging therefrom, said articulating connections including hinge pin connections for connecting adjacent shoes together provided in the distal ends of each leg of said V-shaped rib.

3. In combination, a pneumatic tire having evenly spaced V-shaped grooves extending crosswise of its tread, an endless track completely surrounding and engaging the circumference of said tire, said track comprising a plurality of shoes and articulating connections between adjacent shoes, each of said shoes having a V-shaped grouser rigidly associated with its ground engaging face, and a V-shaped rib on the tire-engaging surface of each shoe, said V-shaped grouser being oppositely disposed with respect to said V-shaped rib, each of said shoes being wider crosswise of the tire tread than lengthwise around the periphery of the tire, the apex of each said grouser and each said V-shaped rib lying near the center line of the tire tread and with legs diverging therefrom, the distal ends of said legs terminating near the ends of the longer sides of said shoe, said articulating connections including hinge pin connections for connecting adjacent shoes together provided near the distal ends of each of said legs, said legs being substantially in line with their respective hinge pin connection, said hinge pin connections being hollow open-ended tread engaging bosses, the bosses at the distal ends of each said grouser being so positioned as to place their inner faces approximately in line with the outer faces of the bosses at the distal ends of said adjacent associated rib, said connections including two short hinge pins respectively at opposite sides of the shoe, said hinge pins having their centers in alignment with each other and substantially in alignment with the radially mid-portion of the carcass tread section of said tire.

4. In combination, a pneumatic tire having spaced V-shaped grooves extending crosswise of its tread, an endless track completely surrounding and engaging the circumference of said tire, said track comprising a plurality of shoes and articulating connections between adjacent shoes, each of said shoes having a V-shaped grouser rigidly associated with its ground engaging face, and a V-shaped rib on the tire-engaging surface of each shoe, said V-shaped grouser being oppositely disposed with respect to said V-shaped rib, the apex of each V-shaped rib positioned near the center line of the tire tread and legs diverging therefrom, said articulating connections including hinge pin connections for connecting adjacent shoes together provided in the distal ends of each leg of each said V-shaped rib, said hinge pin connections being hollow open-ended tire engaging bosses, said V-shaped ribs conforming to and fitting into said spaced grooves of said tire tread, said tire being of such construction and under a working pressure to substantially flatten the tire where it engages the ground under load, said flattening action causing the side portions of said tire grooves to embrace said ribs and bosses, thereby preventing any creeping effect of said tire within said track.

5. A track shoe having a width across the track greater than its length along the track, said shoe having a V-shaped grouser rigidly associated with its ground engaging surface, a V-shaped rib on the tire-engaging surface of said shoe, the apex of said V-shaped grouser being oppositely disposed to the apex of said V-shaped rib, the apexes of said grouser and rib lying near the center line of the track shoe, and their legs diverging therefrom, the distal ends of said legs terminating near the ends of the longer sides of said shoe, hinge pin connections being provided near the distal ends of each of said legs, said hinge pin connections being hollow open-ended tire-engaging bosses.

6. A track shoe having a width across the track greater than its length along the track, said shoe having a V-shaped grouser rigidly associated with its ground-engaging surface, a V-shaped rib on the tire-engaging surface of said shoe, the apex of said V-shaped grouser being oppositely disposed with respect to the apex of said V-shaped rib, the apexes of said grouser and rib lying near the center line of the track shoe, their legs diverging therefrom, the distal ends of said legs terminating near the ends of the longer sides of said shoe, hinge pin connections being provided near the distal ends of each of said legs, said legs being substantially in line with their respective hinge pin connections, said hinge pin connections being hollow open-ended bosses, said bosses providing a tire engaging surface at the distal ends of each leg of said rib, the bosses at the distal ends of said grouser being so positioned as to place their inner faces approximately in line with the outer face of the bosses at the distal ends of said rib.

7. A track shoe having a width across the track greater than its length along the track, said shoe having a main web portion, the outer side portions of said web inclined away from the central portion of the shoe, said web having a V-shaped grouser rigidly associated with its ground engaging surface, the distal end portions of said grouser extending upwardly to integrally join with the inclined side portions of said web, a V-shaped rib on the tire-engaging surface of said shoe, the apex of said V-shaped grouser being oppositely disposed with respect to the apex of said V-shaped rib, the apexes of said grouser and rib lying near the center line of the track shoe, their legs diverging therefrom, the distal ends of said legs terminating near the ends of the longer sides of said shoe, hinge pin connections being provided near the distal ends of each of said legs, said legs being substantially in line with their respective hinge pin connections, said hinge pin connections being hollow open-ended bosses, said bosses providing a tire engaging surface at the distal ends of each leg of said rib, the bosses at the distal ends of said grouser being so positioned as to place their inner faces approximately in line with the outer face of the bosses at the distal ends of said rib.

8. A track shoe having a width across the track greater than its length along the track, said shoe having a V-shaped grouser rigidly associated with its ground-engaging surface, a V-shaped rib on the tire-engaging surface of said shoe, the apex of said V-shaped grouser being oppositely disposed with respect to the apex of said V-shaped rib, the apexes of said grouser and rib lying near the center line of the track shoe, their legs diverging therefrom, the distal ends of said legs terminating near the ends of the longer sides of said shoe, hinge pin connections being provided near the distal ends of each of said legs, said legs being substantially in line with their respective hinge pin connections, said hinge pin connections being hollow open-ended bosses, the bosses at the distal ends of said grouser being so positioned as to place their inner faces approximately in line with the outer face of the bosses at the distal ends of said rib, thereby providing maximum spacing between adjacent grousers when two or more of said shoes are connected together.

9. A track shoe having a width across the track greater than its length along the track, said shoe having a grouser rigidly associated with its ground-engaging surface, said grouser being angularly disposed to the longer edge of said track shoe, a rib on the tire-engaging surface of said shoe, said rib being angularly disposed to the longer edge of said track shoe, said grouser having an angulation different from the angulation of said rib and hinge pin connections being provided at the distal ends of said grouser and said rib.

10. A track shoe having a width across the track greater than its length along the track, said shoe having a grouser rigidly associated with its ground-engaging surface, said grouser comprising a plurality of angularly disposed legs, a rib on the tire-engaging surface of said shoe, said rib comprising a plurality of angularly disposed legs, the angulation of said grouser being opposed to that of said rib.

References Cited in the file of this patent

UNITED STATES PATENTS

| | | |
|---|---|---|
| 888,269 | Stevens | May 19, 1908 |
| 1,307,036 | Bretscher | June 17, 1919 |
| 2,046,299 | Armington | June 30, 1936 |

FOREIGN PATENTS

| | | |
|---|---|---|
| 514,188 | France | Nov. 13, 1920 |